United States Patent
van den Berg

[11] 3,902,142
[45] Aug. 26, 1975

[54] LASER BEAM CONTROL APPARATUS

[75] Inventor: Max van den Berg, Hochetetten, Germany

[73] Assignee: European Atomic Energy Community (Euratom), Kirchberg, Luxemburg

[22] Filed: Jan. 2, 1974

[21] Appl. No.: 429,810

Related U.S. Application Data

[63] Continuation of Ser. No. 220,670, Jan. 25, 1972, abandoned.

[30] Foreign Application Priority Data
Feb. 18, 1971  Luxemburg.......................... 62630

[52] U.S. Cl........... 332/7.51; 331/94.5 M; 350/273; 350/274; 250/233
[51] Int. Cl.............................................. H01s 3/10
[58] Field of Search .......... 332/7.51; 350/266, 269, 350/273, 274, 160; 88/23, 61 F; 331/94.5 M

[56] References Cited
UNITED STATES PATENTS
1,408,386  2/1922  Newton.............................. 350/268
3,024,700  3/1962  McClellan........................... 350/274
3,435,213  3/1969  Colbow et al....................... 332/7.51
3,619,037  11/1971  Pugh.................................. 350/269

FOREIGN PATENTS OR APPLICATIONS
847,440  9/1960  United Kingdom................ 88/61 F

*Primary Examiner*—Maynard R. Wilbur
*Assistant Examiner*—N. Moskowitz
*Attorney, Agent, or Firm*—Stevens, Davis, Miller & Mosher

[57] ABSTRACT

A control device for a laser beam, comprising a wheel which is driven at constant speed and has smooth sheet metal blades. The blades have a surface orientation perpendicular to the circumferential orientation and are supported for pivoting about an axis which is disposed in the surface of the wheel and extends through the wheel axis. A casing surrounds the bladed wheel and has an inlet and an outlet for a laser beam at positions at which the line connecting the two apertures perpendicularly intersects the pivoting axis in the zone of the blades.

5 Claims, 1 Drawing Figure

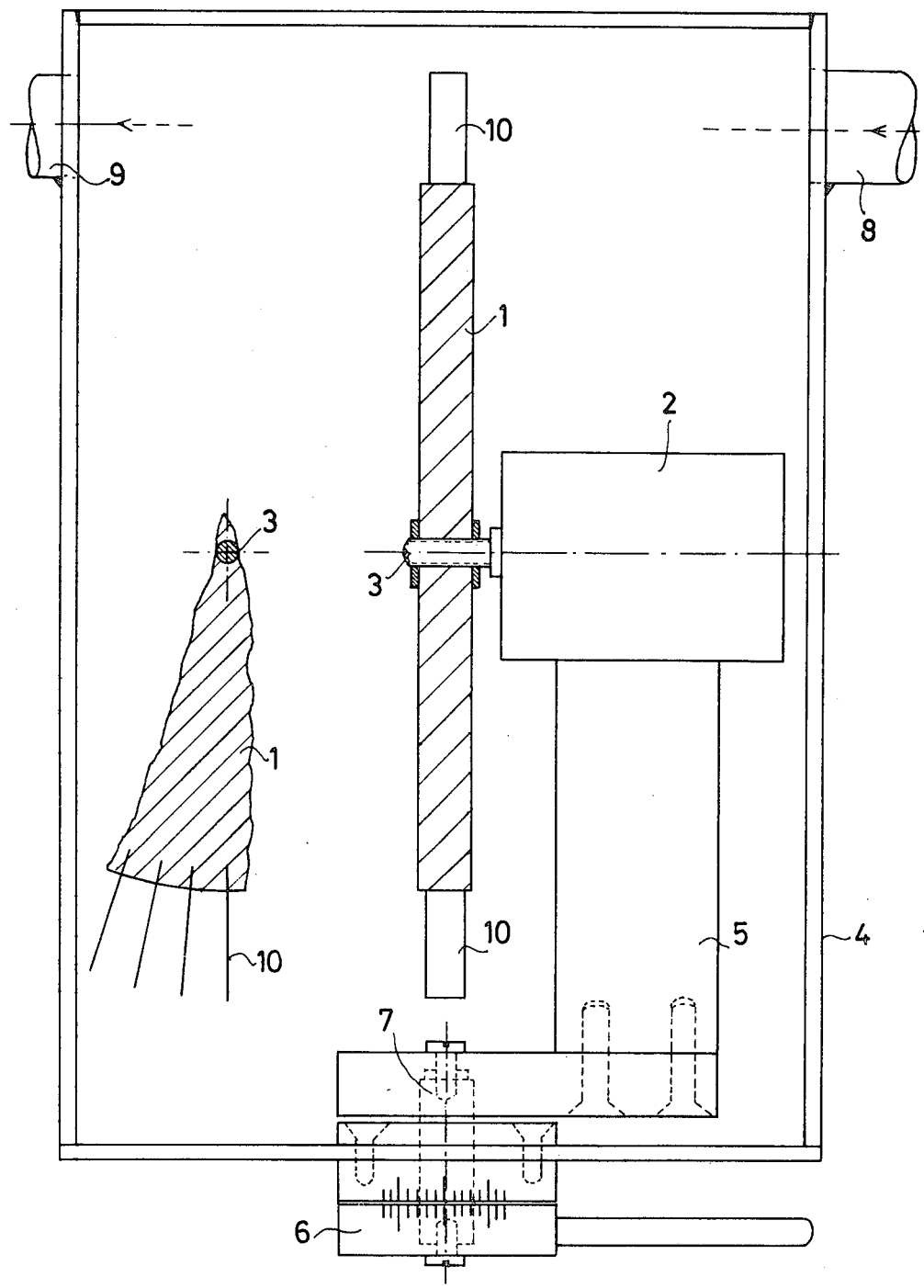

LASER BEAM CONTROL APPARATUS

This is a continuation, of application Ser. No. 220,670, filed Jan. 25, 1972, now abandoned.

FIELD OF THE INVENTION

The invention relates to influencing the energy of a highly energetic light beam in a defined manner, the degree of influence being selectable.

BACKGROUND OF THE INVENTION

In conventional optics so-called step wedges or grey scales are employed for the above mentioned problem, such wedges or scales being disposed on the circular tracks of a control disc. Each angular position of the disc is then associated with a defined attenuation factor. Unfortunately, this method is unsuitable in laser optics owing to the high energy density, because it is not possible to dissipate the high energy absorbed in the disc.

It would be possible to replace absorption control by reflection control, namely by employing partially reflecting reflectors and by conducting a partial ray into a suitable absorption vessel. However, this method suffers from the disadvantage of reduced flexibility with respect to the attenuation factor since the dividing ratio of the partially reflecting reflector cannot be varied.

Control of the laser generator is another possibility of controlling the energy of a laser beam. However, this method cannot be employed if comparative measurements are to be performed between two coherent laser beams originating from a single generator and when only a single beam is to be subjected to control.

SUMMARY OF THE INVENTION

Apparatus according to the invention for controlling the energy of a laser beam comprises a bladed wheel, driven at a constant rotational speed, the blades of said bladed wheel being constructed as smooth sheet metal strips with a surface orientation perpendicular to the circumferential orientation and being supported so as to be pivotable about an axis disposed in the wheel surface and extending through the wheel axis in a casing which surrounds the bladed wheel, the casing having laser beam inlet and laser beam outlet apertures at positions at which the line connecting the two apertures perpendicularly intersects the pivoting axis in the blade zone. In a preferred embodiment the width of the blades is made approximately equal to the distance between two blades. The bladed wheel and an associated motor in the casing is supported by a bearing journal which is rotatably mounted in the casing wall and is provided on the interior with retaining means for the motor and the wheel while the exterior terminates in a graduated adjusting knob.

Rhythmic control of the laser beam energy by means of the bladed wheel according to the invention may be performed particularly advantageously if the wheel is bladed over only half its circumference so that the laser beam traverses without attenuation through the apparatus during half a rotational cycle of the wheel.

The degree of attenuation of the laser beam on traversing through the apparatus depends on the angle included by the wheel surface and the line connecting the two apertures. This angle may be continuously varied by an adjusting knob.

The underlying principle of operation of the apparatus according to the invention therefore comprise the uniform distribution of the energy proportion to be absorbed over the circumference of the bladed wheel. Since part of the energy is not absorbed by the blades themselves but is reflected thereby to the casing wall, it follows that the absorption energy is relatively uniformly distributed over the entire apparatus.

BRIEF DESCRIPTION OF THE DRAWING

The single FIGURE illustrates a preferred embodiment of the invention.

DESCRIPTION OF THE PREFERRED EMBODIMENT

The most important part of the apparatus is a bladed wheel 1, driven by a motor 2. The motor may be constructed as a stepping motor so that the angular position of the wheel may be precisely reproduced. The wheel 1, the wheel shaft 3 and the motor are pivotably supported by retaining means in a casing 4 which surrounds the wheel on all sides. The retaining means comprise an inner supporting arm 5, an external adjusting knob 6 and a bearing journal 7 which joins the two parts to each other transversely to the casing wall. The bearing journal is so disposed that its axis is disposed in the medium surface of the bladed wheel 1 and intersects the axis of the wheel shaft 3. Rotation of the adjusting knob 6 therefore rotates the wheel about an axis which is disposed in the wheel surface, a graduation on the adjusting knob indicating the angular deflection with respect to a zero position.

The laser beam traverses the casing rectilinearly from an inlet aperture 8 to an exit aperture 9. The line connecting the two apertures intersects the bladed wheel in the zone of the blades 10 so that the axis of the bearing journal 7 forms a point of intersection with the aforementioned connecting line. The zero position of the bladed wheel is defined by virtue of the fact that the connecting line between the two apertures is disposed perpendicularly on the wheel surface.

The blades 10 are constructed as flat metal plates which are uniformly distributed over the circumference of the wheel. The width of the blades corresponds approximately to the distance between two blades. As can be seen from the sectional sector drawing in the illustration, the blades are purely radially and outwardly orientated. Because the thickness of the blade plates is very slight and the blades offer their narrow side to the laser beam when the bladed wheel is in the zero position, as may be seen by reference to the partial sector drawing, this zero position will be characterised as the position in which the output energy of the laser beam is a maximum: it is almost identical to the input energy.

If the bladed wheel is rotated with the adjusting knob 6 so that the laser beam forms an angle with the wheel surface, the blade plates 10 will also be disposed at an angle to the laser beam and prevent its free transmission during a period of time which will depend on the selected angle. If a sufficiently high rotational speed is selected for the wheel, the effects of brief, complete interruption of the laser beam will no longer be apparent and merely a reduction of the laser energy by an amount depending on the angle of adjustment of the wheel will be detected.

In an advantageous further embodiment of the invention the apparatus may be employed for the rhythmic pulsing of the energy of a laser beam by providing only half the circumference of the wheel with blades. The said half may either be continuous or it may be divided into two quarters of the circumference, each being separated by two quarters of unbladed circumference.

The full laser beam appears at the output of the apparatus according to the invention during one half of the pulsing period while during the other half of the pulsing period the energy is reduced by a factor which depends solely on the setting angle of the wheel. In practical tests with the apparatus in which mainly the thermal action of the laser beam is utilised, it was found that the intrinsically square-wave modulation appears as a sinusoidal modulation owing to the inertia of thermal phenomena. The modulation frequency depends directly on the rotational speed of the wheel and the modulation depth depends on the angular setting of the wheel relative to the laser beam.

I claim:
1. Apparatus for providing continuous intensity modulation of a laser beam, comprising a bladed wheel, means for driving said wheel at a constant rotational speed, the blades of said bladed wheel being fixed to said wheel and being constructed as smooth sheet metal strips with a surface orientation perpendicular to the circumferential orientation, and means supporting said bladed wheel for pivotal movement about an axis disposed in the wheel surface and extending through the wheel axis in a casing which surrounds the bladed wheel, the casing having laser beam inlet and laser beam outlet apertures at positions at which the line connecting the two apertures perpendicularly intersects the pivoting axis in the blade zone.

2. Apparatus according to claim 1, in which the blade width corresponds approximately to the distance between two blades.

3. Apparatus according to claim 1, in which a bearing journal is rotatably mounted in the casing wall in alignment with the pivoting axis, said journal being provided on the interior with retaining means for a motor and for the wheel shaft and being provided on the exterior with a graduated adjusting knob.

4. Apparatus according to claim 1 for the rhythmic pulsing of the energy of a laser beam, wherein only one half of the circumference of the wheel is bladed.

5. Apparatus according to claim 4, in which the wheel is alternately bladed over $2^k$-th of the circumference and is unbladed thereto, $k$ being a positive integer.

* * * * *